W. A. INGALLS.
PLANTER.
APPLICATION FILED APR. 26, 1920.
1,403,325. Patented Jan. 10, 1922.
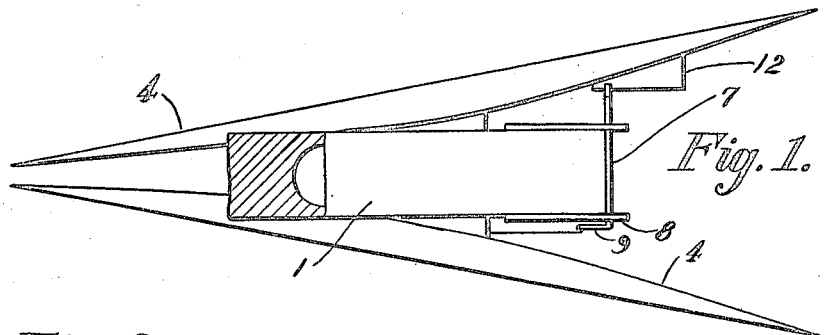
Fig. 1.
Fig. 2.
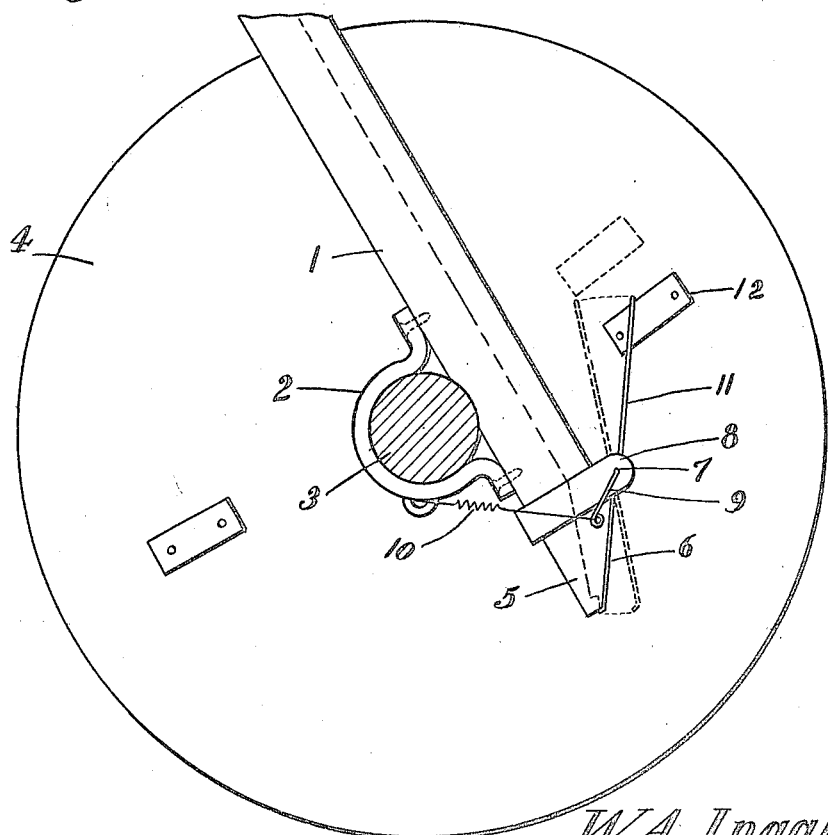
W. A. Ingalls,
Inventor
Witness

UNITED STATES PATENT OFFICE.

WILLIAM A. INGALLS, OF SCOTTSBLUFF, NEBRASKA.

PLANTER.

1,403,325. Specification of Letters Patent. Patented Jan. 10, 1922.

Application filed April 26, 1920. Serial No. 376,769.

*To all whom it may concern:*

Be it known that I, WILLIAM A. INGALLS, a citizen of the United States, residing at Scottsbluff, in the county of Scotts Bluff and State of Nebraska, have invented a new and useful Planter, of which the following is a specification.

This invention relates to planters particularly designed for use in planting beet or any other seeds in hills, the same being adapted for use with supporting wheels or disks which will open up the surface of the soil so as to produce a shallow furrow in which the seeds will be deposited.

A further object is to provide means operated by the rotating wheels or disks for depositing the seeds at regular intervals.

Another object is to provide planting mechanism of this character that can also be used with the usual runner and covering wheels.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a view partly in section and partly in plan of the structure constituting the present invention.

Figure 2 is a view partly in side elevation and partly in section.

Referring to the figures by characters of reference 1 designates a seed tube provided with a bearing 2 clamped upon an axle 3 and journaled on this axle at opposite sides of the tube are furrow opening disks 4. The lower end of the tube 1 is provided with an outlet spout 5 the front face of which is opened but has a cover 6 adapted to rest thereupon so as to prevent the escape of seed. This cover is secured at its upper end to a rod 7 mounted for rotation in ears 8 and an arm 9 is extended from one end of the rod and is connected by a spring 10 to the bearing 2. An elongated arm 11 projects from the other end of the rod 7 and is adapted to be successively engaged and depressed by ears or projections 12 extending inwardly from one of the disks 4. Thus it will be seen that as the device is drawn forwardly the projections 12 will successively move against and shift the arm 11 so as to cause the gate or cover 6 to open and as soon as the arm 11 is released the spring 10 will move the gate to closed position.

From the foregoing it will be obvious that the seeds will be dropped at regular intervals into the soil and a great saving of seeds will thus be effected over the old method of planting beets and the like in drills.

What is claimed is:

A planter for beet seeds and the like, comprising a pair of forwardly converging furrow opening wheels, a feed tube supported between the wheels and having an outlet at its lower end between said wheels, a gate hingedly connected to the shoe and constituting a closure for the outlet, an arm fixed relative to and movable with the gate, yielding means for holding the gate normally closed, and a projection upon one of the wheels for engaging the arm momentarily during each rotation of the wheel, thereby to shift the arm to move the gate to open position.

In testimony that I claim the foregoing as my own, I have hereto affixed my signature in the presence of two witnesses.

WILLIAM A. INGALLS.

Witnesses:
WM. MORROW,
L. C. MCGUIRE.